(12) United States Patent
Falloon et al.

(10) Patent No.: US 7,615,168 B2
(45) Date of Patent: Nov. 10, 2009

(54) FLAME RETARDANTS AND FLAME RETARDED POLYMERS

(75) Inventors: Stephen B. Falloon, Lafayette, IN (US); Richard S. Rose, West Lafayette, IN (US); Matthew D. Phillips, Camden, IN (US)

(73) Assignee: Chemtura Corporation, Middlebury, CT (US)

( * ) Notice: Subject to any disclaimer, the term of this patent is extended or adjusted under 35 U.S.C. 154(b) by 535 days.

(21) Appl. No.: 11/384,581

(22) Filed: Mar. 20, 2006

(65) Prior Publication Data

US 2006/0208238 A1 Sep. 21, 2006

Related U.S. Application Data

(60) Provisional application No. 60/663,919, filed on Mar. 21, 2005.

(51) Int. Cl.
| C09K 21/08 | (2006.01) |
| C09K 21/12 | (2006.01) |
| C09K 21/14 | (2006.01) |
| C08J 9/00  | (2006.01) |
| C08J 9/22  | (2006.01) |

(52) U.S. Cl. .................. 252/609; 521/53; 521/54; 521/55; 521/85; 521/88; 521/98; 521/107; 521/182

(58) Field of Classification Search .............. 252/609
See application file for complete search history.

(56) References Cited

U.S. PATENT DOCUMENTS

| 4,246,360 A |   | 1/1981  | Brown et al. |
| 4,273,881 A |   | 6/1981  | Otten |
| 4,407,891 A |   | 10/1983 | Ernsberger |
| 4,407,981 A |   | 10/1983 | Aaronson |
| 4,565,833 A |   | 1/1986  | Buszard et al. |
| 4,649,163 A |   | 3/1987  | Tairaka |
| 4,696,952 A |   | 9/1987  | Shimomura et al. |
| 4,746,682 A | * | 5/1988  | Green ................. 521/107 |
| 4,751,252 A |   | 6/1988  | Clatty |
| 4,880,844 A |   | 11/1989 | Fesman |
| 4,892,683 A |   | 1/1990  | Naseem |
| 4,892,892 A | * | 1/1990  | Favstritsky et al. ......... 521/107 |
| 4,910,241 A |   | 3/1990  | Abolins et al. |
| 4,954,542 A |   | 9/1990  | Bohen et al. |
| 5,036,121 A |   | 7/1991  | Coaker et al. |
| 5,164,417 A |   | 11/1992 | Anderson |
| 5,328,627 A |   | 7/1994  | Bohen et al. |
| 5,578,651 A |   | 11/1996 | Lamberts et al. |
| 5,672,645 A |   | 9/1997  | Eckel et al. |
| 5,728,746 A |   | 3/1998  | Sicken |
| 5,728,760 A | * | 3/1998  | Rose et al. .............. 524/292 |
| 5,958,993 A |   | 9/1999  | Blundell et al. |
| 6,054,499 A |   | 4/2000  | Pauls et al. |
| 7,008,973 B2 | * | 3/2006  | Falloon et al. ............. 521/106 |
| 7,307,183 B2 | * | 12/2007 | Bartley et al. .............. 560/98 |
| 7,423,069 B2 | * | 9/2008  | Buszard et al. ............ 521/106 |
| 2003/0078325 A1 | * | 4/2003  | Rose et al. ............... 524/141 |
| 2003/0216484 A1 | * | 11/2003 | Phillips et al. .............. 521/50 |
| 2004/0030011 A1 | * | 2/2004  | Buszard et al. ............ 524/127 |
| 2004/0171709 A1 | * | 9/2004  | Falloon et al. ............... 521/99 |
| 2006/0063867 A1 | * | 3/2006  | Durairaj et al. ............ 524/115 |
| 2006/0122285 A1 | * | 6/2006  | Falloon et al. ............. 521/107 |
| 2007/0221892 A1 | * | 9/2007  | Falloon et al. .............. 252/601 |

FOREIGN PATENT DOCUMENTS

| EP | 0 005 903 B1 | 6/1983 |
| EP | 0 308 733 B1 | 1/1992 |
| EP | 0 884 340 A1 | 12/1998 |
| EP | 0 428 221 B1 | 10/2000 |
| GB | 1146173      | 3/1969 |
| GB | 2 011 449 A  | 7/1979 |
| JP | 10147708     | 6/1998 |
| WO | WO 89/03854 A1 | 5/1989 |
| WO | WO 96/35744 A1 | 11/1996 |
| WO | WO 98/57920 A2 | 12/1998 |
| WO | WO 98/57920 A3 | 12/1998 |
| WO | WO 99/31173 A1 | 6/1999 |
| WO | WO 01/18088 A1 | 3/2001 |
| WO | WO 03/064361 A1 | 8/2003 |
| WO | 03/099919 A1 | 12/2003 |
| WO | 2005/118699 A1 | 12/2005 |

* cited by examiner

Primary Examiner—Joseph D Anthony
(74) Attorney, Agent, or Firm—Jaimes Sher

(57) ABSTRACT

There is presented a new flame retardant composition comprising a brominated aromatic composition and a butyl substituted phenyl phosphate.

17 Claims, No Drawings

FLAME RETARDANTS AND FLAME RETARDED POLYMERS

Flexible polyurethane foam producers are being pressured to produce foam that meets flammability standards with higher fire safety requirements when used in furniture applications. California has proposed increasing the flammability criteria in the form of its new draft of Bulletin 117. The U.S. Congress and the United States Consumer Product Safety Commission are moving toward a national fire safety standard for upholstered furniture.

Flame retardants based upon pentabromodiphenyl oxide (PBDE) and alkylated triphenyl phosphates have traditionally been used to meet the requirements of the California bulletin 117 as mentioned in U.S. Pat. No. 4,746,682. The market place is seeking alternatives to pentabromodiphenyl oxide.

"PBDE free" flame retardants such as blends of a tetrabromobenzoate and an isopropylated triphenyl phosphate as described in U.S. Pat. No. 5,728,760 is available, but loading levels approximately 5% higher than the PBDE based flame retardants is required in low density foams (1.2 pcf) to achieve a comparable level of flame retardancy. This increase in flame retardant load level increases the cost to produce the resulting polyurethane foam. As loading of flame retardant in flexible polyurethane foam looses resilience. By definition, loss of resilience is not an issue for rigid foam of polyurethane.

What is needed is a flame retardant system that meets the more stringent flammability requirements and has similar or improved efficiency as compared to the traditional PBDE based flame retardants, yet because of enhanced efficiency does not cause loss of resilience. Such an efficient flame retardant may be useful in polymers generally, both thermoplastic and thermoset.

DETAILED DESCRIPTION

Advantages, characteristics, and properties of the disclosed compositions may be better understood from the following illustrative and non-limiting description of embodiments.

The invention relates to a flame retardant comprising a combination of components suitable for reducing the flammability of combustible polymers such as alkyl substituted triphenyl phosphates and halogen substituted aromatic compounds.

The invention further relates to a flame retarded flexible polyurethane foam composition and a method of flame retarding flexible polyurethane foam. The composition comprises an otherwise flammable flexible polyurethane foam and a two component flame retardant additive:

Component A—alkyl substituted phenyl phosphates

Component B—a brominated flame retardant.

Component A: is an alkyl substituted phenyl phosphate. These are represented by the general structure where each R is independently a linear or branched $C_4$ to $C_6$ alkyl group where m is an integer from 1 to 3, but m on at least one phenyl ring is 1 or more. Examples of the more preferred Structure IV materials include

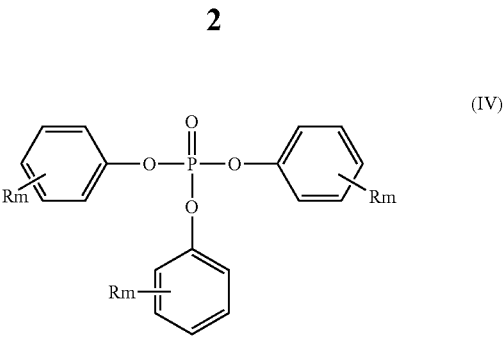

(IV)

A preferred embodiment includes R as a butyl substituent, more preferably i-butyl or t-butyl.

Preferred Component A materials are butylated triphenyl phosphates. It is to be understood that these include pure compounds such as 4-butylphenyl(diphenyl phosphate), as well as mixed triphenyl phosphates in which the individual rings might contain independently 0, 1 or 2 butyl groups, preferably but at least one phenyl ring is butyl substituted. The mixture of alkylated phenyl phosphates is a natural result of the manufacturing process involving alkylated phenols as a starting material. Phenolic starting materials are frequently not uniformly alkylated. Some phenol molecules may not be alkylated at all. Preferably the non-alkylated phenol is not more than 50 wt percent of the phenolic starting material. Economic limitations of phenolic alkylation often make reducing the non-alkylated phenol content below 5 wt percent impractical. More practical is phenol with 20 wt percent non-alkylated. Thus, individual molecules of triphenyl phosphate may have 0, 1, or 2 alkyl substitutions. On average, the level of substitution is more than 0.3, often more than 1, but less than 2. In general, these alkylated triphenyl phosphates will contain in bulk anywhere from about 9 wt. % phosphorus down to about 6.0 wt. % phosphorus depending on the degree of alkylation.

Component B: The flame retardant additives in Group B are comprised of halogenated flame retardants containing preferably more than 30% halogen by weight. Compounds having less than about 30 wt. % halogen may also be useful, but it is believed that excessively high amounts of such compounds would be needed to provide the necessary level of flame retardancy without adversely impacting the physical properties of the foam. High levels of flame retardant have a detrimental effect on the physical properties of the resulting foams. Included in the description of suitable halogen containing flame retardants are compounds containing various halogenated alkyl, aryl or alkyl aryl groups as long as the size of the groups does not dilute the halogen content below about 30 wt. %. The Component B may be monomeric, dimeric, or oligomeric.

A most preferred group of halogen-containing additives includes brominated alkylated aromatics, aromatic ethers, benzoates, and phthalates. These are represented by the general structures I, II, and III below where n is an integer from 1 to 5 for structures I and II, and n is an integer from 1 to 4 for structure III. R and $R_1$ are independently an alkyl group containing from 1 to 16 carbon atoms. Preferably less than 12 carbon atoms, more preferably less than 10 carbon atoms. Too large an alkyl group may cause a decrease in physical properties of the resulting polyurethane foam. One or more N, O, or S atoms may be present in the substituent represented by R. The compounds, particularly the benzoates and phthalates, may optionally be blended together. A bromine content of 30% is useful. Preferably component B may contain up to 42%, or more bromine by weight. It will be understood that individual molecules may have varying degrees of bromination where n is an integer, but when considering a halogen containing additive in bulk, the degree of bromination on the aromatic ring is a positive number greater than one, and less than or equal to 5 for structures I and II, and greater than one, and less than or equal to 4 for structure III representing an average degree of bromination.

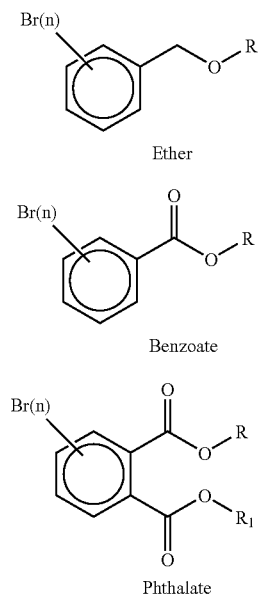

Benzoates and phthalates are known commercially available compositions. Brominated phenyl ethers may be prepared as described in WO 03/064361.

Components A and B are used in ratios that are readily determined to provide the best balance of properties for the intended application. These ratios are typically from about 95:5 to about 5:95 wt. %, preferably from about 30 to 70 parts per hundred parts component A, with the balance of component B. A preferred ratio centers about 50 wt. % of the alkyl substituted triphenyl phosphates and about 50 wt. % of the brominated aromatic component. The preferred ratio of components A and components may vary depending on the relative economics of the components the preference of the customers/end-users, and ease of processing, with component A generally comprising from 40 to 60 wt. % of the flame retardant composition with the balance component B. This ratio flame retardant compounds A and B does not preclude other components having flame retarding properties such as talc, melamine, or antimony oxide synergists. The combination of flame retardant components A and B may either be done separately such that the A and B may be provided as a single flame retardant package, or the individual components may be added individually to the other reactants for polymers formed in situ such as thermoset polymers including polyurethane. For thermoplastics, addition of flame retardants is advantageously accomplished by melt blending the flame retardants with the polymer. When used as a precombined package in polyurethane the A+B blend is typically used in an amount of from 3 to 30 php by weight based on the polyol used in the formulation. Manufacturers are not inclined to use excess flame retardant for reasons including cost and performance. Depending on the proposed use, flexible polyurethane foams may include from 5 php, to 8 php flame retardant in general applications. Where greater flame retardance is required, flame retardant may comprise 11 to 14 php, up to 20 or event 25 php.

For other thermoset and for thermoplastics the portion of flame retardant blend will be impacted by the flame retardant requirements of the customer/end-use, and the flammability properties of the polymer. Suitable flame retardancy may be attained with as little as 0.1 part by weight to as much as 25 parts by weight of total polymer. Advantageous balancing of polymer properties and flame retardancy often limit the flame retardant content to 15 to 20 parts. Sufficient flame retardancy often requires the presence of 3 or more parts flame retardant, up to 5 and even 8 parts flame retardant by weight.

Surprisingly it was observed that flexible polyurethane foams containing blends of A and B where the A component was a butylated triphenyl phosphate were 1 to 2 php more efficient than corresponding blends containing an isopropylated triphenyl phosphate. It would not be expected that a blend with a higher organic content, such as the blends with the butylated phosphates would demonstrate enhanced flame retardant efficiency comparable to propylated phosphates as a flame retardant. The reduced flame retardant requirement affords the opportunity for improved flexible foams, particularly with respect to resilience.

Other examples in the literature note that isopropylated triphenyl phosphates can be use in combination with pentabromobenzyl alkyl ethers as described in WO 03/064361 and with alkylated pentabrominated benzene as described in U.S. Pat. No. 4,892,892. Neither patent discloses or predicts that the use of butylated triphenyl phosphates would be more efficient flame retardants than isopropylated triphenyl phosphates. Efficiency means a more effective fire retardancy at the same loading level, or the same fire retardancy as a compared flame retardant at a lower loading level.

EXAMPLES 1-18

The flexible polyurethane foams that are a part of the invention are well known in the industry. Information on preparation and common reactants can be found in many resources, including the Encyclopedia of Polymer Science and Engineering, Vol. 13, copyright 1988, John Wiley & Sons, Inc., incorporated herein by reference. Additional permissible ingredients are well known as components of polyurethane foams such as catalysts, surfactants, antioxidants, anti-dripping agents, flame retardant synergists, dyes, and pigments.

Typical laboratory hand mix flexible polyurethane foam was prepared for examples 1-18 using the formulations listed below. The flame retardant and load level as well as measured properties are shown in the following tables 2-7. The flame retardant is described in the attached tables. Flame retardant components are expressed in parts by weight with respect to 100 parts by weight polyol. The foams are tested against the California Bulletin 117 combustibility test part A and part D and the requirements of MVSS 302 standard for foam in automotive applications (49 United States Code of Federal Regulations Title 49, section 571.302). The cream time is measured from the time of addition of the toluene diisocyanate reactant until the foam mixture begins to rise. The rise time is measured from the time of addition of the toluene diisocyanate reactant until the foam stopped rising.

Table 1 identifies components for the flexible polyurethane reaction mixture. Components are measured by weight with relation to 100 parts of polyol component with the exception of toluene diisocyanate. The toluene diisocyanate component is measured stoichiometrically as compared to the reactive OH groups of the polyol. A 100 index represents 1:1 stoichiometry of toluene diisocyanate and polyol. Toluene diisocyanate at a 110 index represents a 10% excess toluene diisocyanate for the sum of hydoxyls present.

TABLE 1

| Component | Php | Manufacturer/Product |
|---|---|---|
| Polyol - 56 OH Index, 3000 M.W. | 100.0 | Dow: Voranol 235-056 |
| H2O | 4.4 | |
| Amine Catalyst | 0.5 | Air Products: Dabco 8264 |
| Silicone Surfactant | 1.0 | GE/Osi Silicones: Niax L-620 |
| Tin Catalyst | 0.3 | Goldschmidt/Deguassa: Kosmos 29 |
| toluene diisocyanate | 110 Index | Bayer: Mondur TDI - Grade A |
| FR | Varies | GLCC |

Evaluation of foam samples included measurement of the airflow, density, indentation-force deflection, and compression set. Air flow is a measure of cross-linking (or for the flexible foam of the instant invention, the lack of cross-linking) according to ASTM D 3574-03, Test G.

Indentation-force deflection measures the load necessary to deflect the foam by a stated percent of its original height following a modified ASTM test B 3574-03. A disk having a diameter of 203 mm is pressed into flexible foam until the foam is compressed the indicated value, expressed as a percent of the original height. Foam blocks tested are 38×38 cm. (15×15 inches).

Compression set measures the loss of resiliency when foam is held under compression. following a modified ASTM test D 3574-03. This evaluation compresses the foam to 50% of its unrestrained height, for 22 hours, at 70° C. The loss of resiliency measured from the failure of the foam to spring back to its pre-test height is reported as a percent of the pre-test height, measured 50 minutes after compression was removed.

TABLE 2

Blends with Butylated Phosphates measured at MVSS 302 Load Level

| | Percent of Total Flame Retardart | | | | | | | | | | | |
|---|---|---|---|---|---|---|---|---|---|---|---|---|
| | Component A | | | Component B | | Measured Properties | | | | | | |
| Ex | tetrabromo benzoate | tetrabromo phthalate | 2-ethylhexyl pentabromo ether | butylated triphenyl phosphate | triphenyl phosphate | Total Flame Retardant Parts (php) | Cream Time Sec | Rise Time Sec | Airflow m³/min | Density kg/m³ (lbs/ft³) | 25% IFD Newtons (pounds) | 25% IFD | Compression Set |
| 1 | 35 | 15 | | 36.5 | 13.5 | 14 | 3 | 56 | 4.60 | 24.4(1.52) | 214(48) | 427(96) | 7.4 |
| 2 | 35 | 15 | | 40 | 10 | 14 | 3 | 57 | 3.96 | 24.5(1.53) | 209(47) | 418(94) | 6.5 |
| 3 | 35 | 15 | | 40 | 10 | 14 | 3 | 57 | 4.20 | 24(1.50) | 209(47) | 418(94) | 7.1 |
| 4 | 35 | 15 | | 41 | 9 | 15 | 3 | 58 | 3.80 | 24(1.50) | 209(47) | 423(95) | 6.6 |
| 5 | 35 | 15 | | 49 | 1 | 17 | 3 | 57 | 4.34 | 24.4(1.52) | 200(45) | 400(90) | 7.5 |
| 6 | 48 | 2 | | 36.5 | 13.5 | 14 | 3 | 57 | 4.30 | 24.2(1.51) | 231(52) | 480(108) | 7.9 |
| 7 | 48 | 2 | | 40 | 10 | 14 | 3 | 56 | 4.20 | 24.4(1.52) | 231(52) | 489(110) | 6.4 |
| 8 | 48 | 2 | | 40 | 10 | 14 | 3 | 57 | 4.40 | 24.4(1.52) | 231(52) | 480(108) | 7.2 |
| 9 | 48 | 2 | | 49 | 1 | 17 | 3 | 57 | 4.50 | 24.4(1.52) | 227(51) | 472(106) | 6.9 |
| 10 | | 50[1] | | 36.5 | 13.5 | 14 | 3 | 58 | 3.70 | 24.8(1.55) | 231(52) | 472(106) | 16.1 |
| 11 | | 50[1] | | 40 | 10 | 14 | 3 | 56 | 3.70 | 24.6(1.54) | 236(53) | 472(106) | 11.9 |
| 12 | | 50[1] | | 40 | 10 | 14 | 3 | 56 | 3.60 | 24.4(1.52) | 231(52) | 472(106) | 15.2 |
| 13 | | 50[1] | | 49 | 1 | 17 | 3 | 55 | 3.90 | 24.4(1.52) | 222(50) | 454(102) | 15.7 |
| 14 | | | 50 | 40 | 10 | 13 | 3 | 56 | 3,46 | 24.6(1.54) | 214(48) | 427(96) | 8.6 |

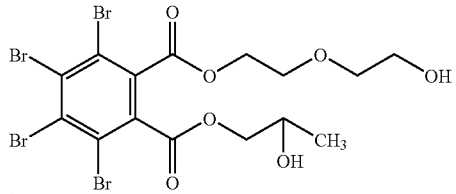

[1] the diol of tetrabromophthalate

TABLE 3

Blends with Butylated Phosphates Cal 117

| | Component A | | | Component B | | | Measured Properties | | | | | |
|---|---|---|---|---|---|---|---|---|---|---|---|---|
| | | | | | | | Aged (Max.) | Aged (Avg.) | UnAged (Max.) | UnAged (Avg.) | | |
| Ex | tetrabromo- benzoate | tetrabromo- phthalate | 2-ethylhexyl- pentabromo- ether | butylated triphenyl phosphate | triphenyl phosphate | Total Flame Retardant (php) | burn time (secs)/ distance (inches) | burn time (secs)/ distance (inches) | burn time (secs)/ distance (inches) | burn time (secs)/ distance (inches) | Part D % Retention | Pass/ Fail |
| | | | Percent of Total Flame Retardant | | | | | | | | | |
| 1 | 35 | 15 | | 36.5 | 13.5 | 14 | 3/4.0 | 1.2/2.8" | 3/3.5" | 0.6/2.2" | 86.30% | Pass |
| 2 | 35 | 15 | | 40 | 10 | 14 | 3/4.0" | 0.6/2.6" | 2/3.5" | 0.4/2.4" | 94.39% | Pass |
| 3 | 35 | 15 | | 40 | 10 | 14 | 3/4.0" | 1/2.6" | 2/3.0" | 0.4/2.2" | 92.21% | Pass |

TABLE 3-continued

Blends with Butylated Phosphates Cal 117

| | Component A | | | Component B | | Measured Properties | | | | | |
|---|---|---|---|---|---|---|---|---|---|---|---|
| | tetrabromo-benzoate | tetrabromo-phthalate | 2-ethylhexyl-pentabromo-ether | butylated triphenyl phosphate | triphenyl phosphate | Total Flame Retardant (php) | Aged (Max.) burn time (secs)/distance (inches) | Aged (Avg.) burn time (secs)/distance (inches) | UnAged (Max.) burn time (secs)/distance (inches) | UnAged (Avg.) burn time (secs)/distance (inches) | Part D % Retention | Pass/Fail |
| Ex | Percent of Total Flame Retardant | | | | | | | | | | | |
| 4 | 35 | 15 | | 41 | 9 | 15 | 3/4.5" | 1.6/3.2" | 3/4.0" | 1/2.5" | 84.47% | Pass |
| 5 | 35 | 15 | | 49 | 1 | 17 | 5/3.5" | 1/2.3" | 3/3.5" | 0.6/2.3" | 92.15% | Pass |
| 6 | 48 | 2 | | 36.5 | 13.5 | 14 | 4/4.5" | 1.4/2.8" | 3/3.0" | 0.6/2.3" | 80.83% | Pass |
| 7 | 48 | 2 | | 40 | 10 | 14 | 3/4.5" | 0.6/2.6" | 2/2.5" | 0.4/1.9" | 86.10% | Pass |
| 8 | 48 | 2 | | 40 | 10 | 14 | 3/4.5" | 1/2.8" | 3/3.0" | 0.5/2.4" | 83.48% | Pass |
| 9 | 48 | 2 | | 49 | 1 | 17 | 4/4.0" | 1.2/2.8" | 3/3.5" | 0.6/2.5" | 86.90% | Pass |
| 10 | | 50[1] | | 36.5 | 13.5 | 14 | 5/4.0" | 1.4/2.7" | 3/3.5" | 0.6/2.5" | 99.50% | Pass |
| 11 | | 50[1] | | 40 | 10 | 14 | 4/4.0" | 1.4/2.6" | 3/3.0" | 1/2.5" | 99.55% | Pass |
| 12 | | 50[1] | | 40 | 10 | 14 | 4/3.5" | 1.2/2.5" | 4/4.0" | 0.8/2.4" | 99.16% | Pass |
| 13 | | 50[1] | | 49 | 1 | 17 | 5/4.5" | 1/2.9" | 4/3.5" | 1.2/2.5" | 98.56% | Pass |
| 14 | | | 50 | 40 | 10 | 13 | 3/5.5" | 1/3.5" | 3/4.5" | 1/3.1" | 99.36% | Pass |

TABLE 4

Blends with Butylated Phosphates MVSS 302

| | Component A | | | Component B | | Measured Properties | | | | |
|---|---|---|---|---|---|---|---|---|---|---|
| | tetrabromo-benzoate | tetrabromo-phthalate | 2-ethylhexyl-pentabromoether | butylated triphenyl phosphate | triphenyl phosphate | Total Flame retardant (php) | Cream Time sec. | Rise Time sec. | Airflow m³/min | Density kg m³ (lbs/ft³) | Rating |
| Ex | Percent of Total Flame Retardant | | | | | | | | | | |
| 1 | 35 | 5 | | 36.5 | 13.5 | 14 | 3 | 56 | 4.60 | 24.3(1.52) | SE |
| 2 | 35 | 15 | | 40 | 10 | 14 | 3 | 57 | 3.96 | 24.5(1.53) | SE |
| 3 | 35 | 15 | | 40 | 10 | 14 | 3 | 57 | 4.20 | 24(1.50) | SE |
| 5 | 35 | 15 | | 49 | 1 | 17 | 3 | 57 | 4.34 | 24.3(1.52) | SE |
| 6 | 48 | 2 | | 36.5 | 13.5 | 14 | 3 | 57 | 4.30 | 24.2(1.51) | SE |
| 7 | 48 | 2 | | 40 | 10 | 14 | 3 | 56 | 4.20 | 24.3(1.52) | SE |
| 8 | 48 | 2 | | 40 | 10 | 14 | 3 | 57 | 4.40 | 24.3(1.52/) | SE |
| 9 | 48 | 2 | | 49 | 1 | 17 | 3 | 57 | 4.50 | 24.3(1.52) | SE |
| 10 | | 50[1] | | 36.5 | 13.5 | 14 | 3 | 58 | 3.70 | 24.8(1.55) | SE |
| 11 | | 50[1] | | 40 | 10 | 14 | 3 | 56 | 3.70 | 24.6(1.54) | SE |
| 12 | | 50[1] | | 40 | 10 | 14 | 3 | 56 | 3.60 | 24.3(1.52) | SE |
| 13 | | 50[1] | | 49 | 1 | 17 | 3 | 55 | 3.90 | 24.3(1.52) | SE |
| 14 | | | 50 | 40 | 10 | 13 | 3 | 57 | 3.46 | 24.6(1.54) | SE |

TABLE 5

Blends with Isopropylated Phosphates measured at MVSS 302 Load Level

| | Component A | | | Component B | | | Measured Properties Total |
|---|---|---|---|---|---|---|---|
| Ex | tetrabromobenzoate | tetrabromophthalate | 2-ethylhexylpentabromoether | butylated triphenyl phosphate | triphenyl phosphate | isopropyl triphenyl phosphate | Flame Retardant Parts (php) |
| | Percent of Total Flame Retardant | | | | | | |
| 15 | 35 | 15 | | | 17.5 | 32.5 | 14 |
| 16 | 35 | 15 | | | 4 | 46 | 14 |
| 17 | 35 | 15 | | | 0.5 | 49.5 | 15 |
| 18 | | | 50 | | 17.5 | 32.5 | 15 |

TABLE 5-continued

Blends with Isopropylated Phosphates measured at MVSS 302 Load Level

| | | | | Measured Properties | | | |
|---|---|---|---|---|---|---|---|
| Ex | Cream Time sec. | Rise Time sec. | Airflow m³/min | Density kg/m³ (lbs/ft³) | 25% IFD Newtons (pounds) | 65% IFD Newtons (pounds) | Compresion Set |
| 15 | 3 | 57 | 4.10 | 24.3(1.52) | 205(46) | 418(94) | 6.7 |
| 16 | 3 | 58 | 4.46 | 24(1.50)   | —       | —       | 7.1 |
| 17 | 3 | 57 | 4.10 | 24.2(1.51) | 200(45) | 409(92) | 7.2 |
| 18 | 3 | 56 | 3.34 | 24.5(1.53) | 187(42) | 378(85) | 6.7 |

TABLE 6

Blends with Isopropylated Phosphates Cal 117

| | Component A | | | Component B isopropylated | | | Measured Properties | | | | | |
|---|---|---|---|---|---|---|---|---|---|---|---|---|
| Ex | tetrabromo-benzoate | tetrabromo-phthalate | 2-ethylhexyl-pentabromoether | triphenyll phosphate | triphenyl phosphate | Total Flame Retardant Parts (php) | Aged (Max.) burn time (sec) distance inches | Aged (Avg.) burn time (sec) distance inches | UnAged (Max.) burn time (sec) distance inches | UnAged (Avg.) burn time (sec) distance inches | Part D % Retention | Pass/Fail |
| | Percent of Total Flame Retardant | | | | | | | | | | | |
| 15 | 35 | 15 |    | 32.5 | 17.5 | 15 | 3/3.5 | 1.2/2.6 | 2/3.0 | 0.4/2.4 | 99.28% | Pass |
| 17 | 35 | 15 |    | 49.5 | 0.5  | 16 | 4/4.0 | 1.4/2.7 | 3/3.5 | 0.6/2.8 | 98.70% | Pass |
| 18 |    |    | 50 | 32.5 | 17.5 | 15 | 0/3.0 | 0/2.3   | 0/3.0 | 0/2.3   | 99.46% | Pass |

TABLE 7

Blends with Isopropylated Phosphates MVSS 302

| | Component A | | | Component B isopropylated | | | Measured Properties | | | | |
|---|---|---|---|---|---|---|---|---|---|---|---|
| Ex | tetrabromo-benzoate | tetrabromo-phthalate | 2-ethylhexyl-pentabromoether | triphenyl phosphate | triphenyl phosphate | Parts (php) | Cream Time sec. | Rise Time sec. | Airflow m³/min | Density kg/m³ (bs/ft³) | Rating |
| | Percent of Total Flame Retardant | | | | | | | | | | |
| 15 | 35 | 15 |    | 32.5 | 17.5 | 14 | 3 | 57 | 4.10 | 24.4(1.52) | SE |
| 16 | 35 | 15 |    | 46   | 4    | 14 | 3 | 58 | 4.46 | 24(1.50)   | SE |
| 17 | 35 | 15 |    | 49.5 | 0.5  | 15 | 3 | 57 | 4.10 | 24.2(1.51) | SE |
| 18 |    |    | 50 | 32.5 | 17.5 | 15 | 3 | 56 | 3.34 | 24.5(1.53) | SE |

The invention claimed is:

1. A flame retardant composition comprising (I) a mixture of brominated benzoate ester and brominated phthalate ester and (II) a butyl substituted phenyl phosphate.

2. A thermoplastic or thermoset polymer comprising the flame retardant composition of claim 1.

3. The composition of claim 2 where the polymer is a polyurethane.

4. The composition of claim 3 where the polyurethane is a foam.

5. The composition of claim 3 where the polyurethane is a flexible foam.

6. The composition of claim 3 where the polyurethane is a rigid foam.

7. The composition of claim 2 where the polymer is comprised of one or more monomers from the group consisting of styrene, ethylene, propylene, butadiene, 3-methyl pentene, acrylonitrile, terephthalate, and phthalic anhydride.

8. The composition of claim 2 where the polymer is one or more polymers from the group consisting of an epoxide, a thermoset polyester, and a polymerized vinyl ester.

9. A flexible polyurethane foam comprising, the reaction product of a diisocyanate;

apolyol;

a butyl substituted phenyl phosphate ester, and a brominated flame retardant that is a mixture of

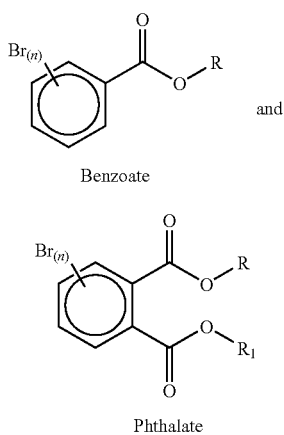

where R and R₁ are independently an alkyl group containing from 1 to 16 carbon atoms and optionally one or more N, O, or S atoms and n is a real number from 1 to 5 for structure II, and n is on average a real number from 1 to 4 for structure III.

10. The foam of claim 9 wherein the substituent R is $CH_2CH_2OCH_3$.

11. The foam of claim 9 wherein the substituent R is $CH_2CH_2O(CH_2)_3CH_3$.

12. The foam of claim 9 wherein the substituent R is $(CH_2)_6OH$.

13. The foam of claim 9 wherein the substituent R is $CH_2CH(C_2H_5)(CH_2)_3CH_3$.

14. The of claim 9 wherein the substituent R is $CH_2CH_2OCH_2CH\!=\!CH_2$.

15. The foam of claim 9 wherein the substituent R is $(C_3H_6O)_2CH_3$.

16. The foam of claim 9 wherein the substituent R is $(C_3H_6O)_2H$.

17. The foam of claim 9 wherein the substituent R is $C_6H_4OH$.

* * * * *